United States Patent [19]
Cwenar

[11] Patent Number: 5,893,079
[45] Date of Patent: Apr. 6, 1999

[54] SYSTEM FOR RECEIVING, PROCESSING, CREATING, STORING, AND DISSEMINATING INVESTMENT INFORMATION

[75] Inventor: Daniel Cwenar, Pittsburgh, Pa.

[73] Assignee: FS Holdings, Inc., Wilmington, Del.

[21] Appl. No.: 825,254

[22] Filed: Mar. 27, 1997

Related U.S. Application Data

[63] Continuation of Ser. No. 354,616, Dec. 13, 1994, abandoned.

[51] Int. Cl.$^6$ .................................................. G06G 7/52
[52] U.S. Cl. .............................. 705/36; 705/37; 705/35
[58] Field of Search .................................. 705/35, 1, 37, 705/36; 707/104; 395/200.47

[56] References Cited

U.S. PATENT DOCUMENTS

| | | | |
|---|---|---|---|
| 4,346,442 | 8/1982 | Musmanno | 364/408 |
| 4,486,543 | 12/1984 | Parsons | 364/900 |
| 4,566,066 | 1/1986 | Towers | 364/408 |
| 4,648,037 | 3/1987 | Valentino | 364/408 |
| 4,933,842 | 6/1990 | Durbin et al. | 364/408 |
| 4,953,085 | 8/1990 | Atkins | 364/408 |
| 4,994,964 | 2/1991 | Wolfberg et al. | 364/408 |
| 5,101,353 | 3/1992 | Lupien et al. | 705/37 |
| 5,126,936 | 6/1992 | Champion et al. | 364/408 |
| 5,132,899 | 7/1992 | Fox | 364/408 |
| 5,193,056 | 3/1993 | Boes | 364/408 |
| 5,262,942 | 11/1993 | Earle | 705/37 |
| 5,315,634 | 5/1994 | Tanaka et al. | 379/57 |
| 5,339,392 | 8/1994 | Risberg et al. | 395/161 |
| 5,414,838 | 5/1995 | Kolton et al. | 395/600 |
| 5,446,885 | 8/1995 | Moore et al. | 707/104 |
| 5,675,746 | 10/1997 | Marshall | 1/1 |
| 5,710,889 | 1/1998 | Clark et al. | 345/344 |

OTHER PUBLICATIONS

Commercial Literature –Portia date unknown.
Commercial Literature –Integrated Decision Systems, Inc. (1994).
Commercial Literature –Computer Aided Decisions, Inc. (Mar., 1993).
Commercial Literature –WinDX date unknown.
Commercial Literature –Shaw Data date unknown.
Commercial Literature –Axys (040894).
Commercial Literature –Financial Models date unknown.
Commercial Literature –Rescom International Manager date unknown.

*Primary Examiner*—James P. Trammell
*Assistant Examiner*—Matthew Smithers
*Attorney, Agent, or Firm*—Arnold B. Silverman; Eckert Seamans Cherin & Mellott, LLC

[57] ABSTRACT

A computerized data processing system includes an external data interface for communicating with nonuser outside sources of investment data and processing such data and delivering such data to a server which processes and stores such investment data in a central databank. Users may access the data stored in the central database which is supported by the server through an external user interface. The receiving, processing, creating and disseminating of data is a shared responsibility which is divided between the external user interface and the server. Multiple users may access the server simultaneously. The preferred embodiments employ a relational database, dynamically linked libraries, and multiple compliance capabilities. The system is particularly suited for use with mutual fund portfolio management and transactional information. The system may combine investment data relating to mutual funds or portions thereof or separate portions of a single fund for purposes of transactions, portfolio management or modeling.

15 Claims, 6 Drawing Sheets

|   | A | B | C |
|---|---|---|---|
| 1 | IBM | PS | 5% |
| 2 | GE | CS | 2.5% |
| 3 | ALCOA | CB | 6% |

FIG. 3

SYSTEM FOR RECEIVING, PROCESSING, CREATING, STORING, AND DISSEMINATING INVESTMENT INFORMATION

This application is a continuation of Ser. No. 08/354,616 filed on Dec. 13, 1994 now abandoned.

BACKGROUND OF THE INVENTION

1. Field of the Invention

This invention relates to a system for receiving, processing, creating and storing for selective retrieval investment information and, more specifically, it provides a system wherein external data interface means receives and processes investment information from nonuser outside sources which is delivered to a server which receives, processes, creates investment information and starts the same in a central database, and also provides access to the server through the external user interface means.

2. Description of the Prior Art

It has long been known in connection with various types of financial and accounting transactions to make advantageous use of computerized receipt, sorting, processing and delivery on-line of information.

For example, it has been known to employ such systems in respect of the purchase and sale of investments, such as stocks, bonds and mutual funds. Such computerized systems can provide a rapid, efficient means for communications involved in such transactions and minimizing the amount of paperwork required.

It has long been known to employ general purpose digital computers and accompanying software to perform financial and accounting functions. See, generally, U.S. Pat. Nos. 4,648,037, 4,953,085, 4,994,464, 5,126,936, and 5,132,899.

It has also been known to use such data processing systems for automated processing of information relating to investments and investment accounts. See, generally, U.S. Pat. Nos. 4,346,442, 4,486,543, 4,566,066, and 5,193,056.

It has been known to employ computerized systems for monitoring investment accounts involving multiple investors and multiple investment funds. See U.S. Pat. No. 4,933,842.

In co-pending application Ser. No. 08/345,881, filed Nov. 28, 1994, which is owned by the assignee of the present application, there is disclosed a system for processing raw data, reformatting the same, storing the same for retrieval premised upon election of certain options by the user.

A system sold under the trade designation "Portia" by Thompson Financial Services employs a relational database in a central data repository and has been employed in connection with investment data processing and storing, but lacks the capabilities of the present invention and is not specifically designed for mutual fund use.

A system sold under the trade designation "CompAlert" sold by Merrin Financial Services has provided compliance monitoring, but not with the capabilities of the present invention, particularly in respect of mutual funds.

It is known that companies in the investment business must subscribe to a number of services which provide investment data. For convenience of reference, such services by computer shall be referred to herein as "nonuser outside sources." In order to employ such information in a timely fashion in effecting investment trades, portfolio analysis, investment counseling and many other purposes, such data must be assimilated into the recipient's system where appropriate processing is employed to modify existing data within the system and to provide access thereto by authorized users.

There remains a very real and substantial need for an improved system to facilitate receipt and processing of such data from nonuser outside sources while facilitating simultaneous access by a plurality of users to such data after processing and storage.

SUMMARY OF THE INVENTION

The present invention has met this need by providing a computerized data processing system for receiving, processing, creating, storing and accessing investment data. External data interface means serves to receive and process data from a plurality of nonuser outside data sources. It resides on the server and is in communication with the central database which also resides on the server. External user interface means resides on the client workstation and communicates with system users and the central database.

The external user interface is resident on the client workstation and accesses the central database through a network as a user desires or requires investment data to perform work. The central database stores data that was received and/or transformed from the external data interface on the server and the external user interface on the client workstation.

A plurality of users may be in communication with the main database through the external user interface means simultaneously. Also, the external user interface means is buffered from the complexities of the vendor sources by the external data interface.

A number of preferred refinements include the use of relational databases, the use of spreadsheet interface means in the external user interface means, employing a graphical user interface, and permitting the external user interface means to both serve as a processor of data and as a gatekeeper for access to the investment data contained in the central database. The system also permits combining or segmenting mutual funds to expedite various dataprocessing functions.

The system also provides compliance means which serves to on a real-time basis compare a proposed trade with a group of rules which can be prioritized with respect to legal or business standards and provide instructions regarding stopping, delaying or proceeding with the proposed trade with appropriate records being kept. The compliance check may be performed on both the external user interface and the server employing rules stored in the main database. It also may be employed on a delayed time basis, as in batch processing.

It is an object of the present invention to provide a computerized system for interfacing with multiple external sources of data to receive updated investment information and to assimilate such information into information contained within the central database which is associated with the server means.

It is a further object of the present invention to provide a system which provides rapid and efficient receipt, processing and delivery of investment information through (a) external data interface means which communicates with the central database which formats and stores the data and external user interface means which both processes information and permits the user to access the central or main database.

It is another object of the present invention to provide such a system which permits real-time, rule-based compliance review in order to determine that a proposed transaction will not violate predetermined rules.

It is a further object of the present invention to provide such a system wherein some of the processing of data occurs in the external user interface means and other processing occurs in the external data interface means.

It is a further object of the invention to enhance efficiency of the system through the use of dynamically linked libraries, relational databases, graphic user interfaces and spreadsheet interfaces.

It is a further object of the present invention to provide such a system which facilitates rapid portfolio review.

It is a further object of the present invention to permit rapid access to information to be employed in managing a mutual fund or any collection of securities.

It is a further object of the present invention to provide a system which delivers timely, accurate investment data to desktop computers in a user friendly way.

It is another object of the present invention to provide such a system wherein a plurality of users may access investment data simultaneously.

It is another object of the present invention to provide such a system which will permit the rapid and accurate computerized processing of large volumes of investment data, such as that involved in mutual fund transactions and portfolio management, for example.

It is a further object of the present invention to provide such a system which will permit investment sale, purchase and other transactions to be consummated in a rapid manner which reduces or eliminates the need for paper transaction tickets.

These and other objects of the invention will be more fully understood from the following detailed description of the invention on reference to the illustrations appended hereto.

BRIEF DESCRIPTION OF THE DRAWINGS

FIG. 3 is an example of a form of relational database organization usable in the present invention.

DESCRIPTION OF THE PREFERRED EMBODIMENTS

Figure 1:
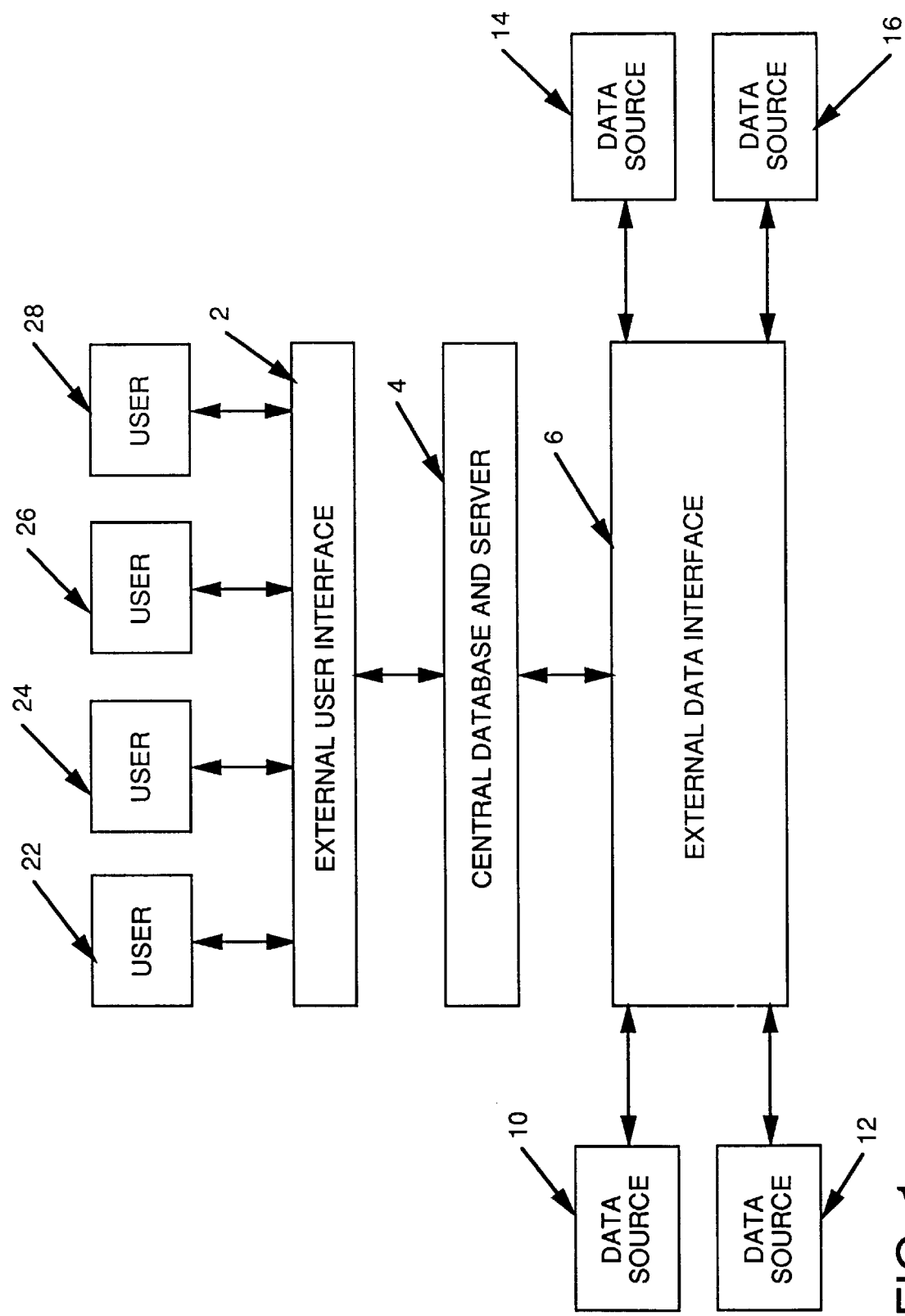
FIG. 1 is a schematic diagram of a preferred embodiment of the present invention.

As employed herein, the term "investment" or "investments" shall expressly include, but not be limited to mutual funds, common and preferred shares of stock, whether listed on an exchange or not, high yield corporate bonds and high grade corporate bonds, municipal bonds, United States bills, notes and bonds, mortgage related investments, and short term securities, such as commercial paper, banker's acceptances, repurchase agreements and supporting mtllti-currencies.

The present invention provides a computerized system for permitting a system to obtain information regarding investments from a plurality of nonuser outside sources, process the same in the external data interface and formatting, creating new data, and storing data in the central database which is on the associated server.

The information is assimilated into the system and processed with the processing burdens being shared by the external user interface architecture and the server. The external data interface runs on the server. A request for data or information originating within the external user interface results in the server means processing the request as by finding the data in the main or central database and returning the information to the external user interface for processing, such as display, performing calculations and performing spreadsheet-like, what-if calculations. In this manner, the processing load is shared between the external user interface at the user workstation and the server. The investment is stored within the central database on the server with users accessing the data stored through the external user interface. During use of the system. data is delivered to the client workstation (external user interface) and placed in temporary storage in the random access memory so that the data can be processed, such as by utilization, manipulation and display, for example. After the user exits the client workstation, the random access memory is released. The system may be employed to effect trades, to monitor proposed transactions for compliance with laws and other rules and preferences and not only provides for a user friendly real-time system, but also eliminates the need for the user to have appropriate interfaces for the various nonuser outside sources of investment data received from sources.

In the client workstation-server concept of the present invention, processing is performed in both units as distinguished from having a more traditional monolithic system. The external user interface 2 and external data interface 6 are in communication with the central database which is resident on the server 4. For convenience of reference in FIG. 1, the block 4 will be referred to, in text, as the server, it being understood that the server has the central database resident thereon with logic functions on such data being performed by the server. The logic functions, processing, creating and storage, and export of data will occur within the server means 4. Conceptually, the external user interface means 2 will function as a gatekeeper and not only will function to receive user inquiries and data, and process the same, but it will deliver some such investment data to the server 4 for processing or storage in box tables for retrieval. User access in order to obtain data from the server means 4 will be through the external user interface means 2. Such information may be delivered to the user on the user interface screen or used to provide hard copy reports, for example.

Typically, a company in the investment business, such as a company which manages one or more mutual funds, will need to have on-line access to a substantial amount of timely and accurate investment information. In FIG. 1, some nonuser outside sources of data are indicated by the blocks labeled DATA SOURCE 10, 12, 14, 16, for example. Any desired number of nonuser outside sources may be connected to the system. Data from nonuser outside sources 10, 12, 14, 16 will be received by external data interface 6 which contains appropriate interchange architecture and rests on server 4. Such data will be stored in the central database. Data sources 10, 12, 14, 16, which may provide information relating to yields, maturities, dividend amounts and payment dates, currency exchange rates, credit ratings and the like may be received from such nonuser outside sources. Also, for purposes of clarity of disclosure herein, the company employing the system of the present invention may also input data into the system through the external user interface means 2. Data received from external data interface 6 and data sources 10, 12, 14, 16 will involve one-way data communication. Communications may be two-way, however, as the interchange architecture is message based, messages may be originated by either the external data interface 6 or a nonuser outside source 10, 12, 14, 16. The data received from data sources 10, 12, 14, 16 is received by the external data interface means 6 and is edited and, if desired, reformatted for ultimate delivery to the storage tables within the server 4. This data may also be employed to update pre-existing data stored within the tables of the main database in server means 4. The main database has a plurality of data storage tables containing investment data. For example, there may be stored with respect to a specific individual security, such as a description of the same, coupon, yield, price, CUSIP, issuer of security, credit providers and trade data, including history, and price history. There is also preferably a data storage table which is a security master having basic information about a specific security.

Among the functions of the central database are to store, retrieve and manipulate investment data, check security, enforce constraints, dynamically optimize user queries, and have triggers that automatically fire on a defined event, for example.

Users 22, 24, 26, 28 will interact with the rest of the system through the smart terminal external user interface 2 at the client workstations. Users may present requests for information from the server 4. All such requests will be made through the external user interface means 2 for data in the central database. It also could provide the external user interface 2 with data such as proposed trades, for example. The user may provide to the external user interface means 2 information regarding user preferences as to mode or content of display or retrieval and other information. For example, if the user, upon logging in each time, desires to know the holdings of mutual fund XYZ, the external user interface means 2 will store this user information and automatically display this information to the user each time the user signs on, even if the user signs on from different workstations.

In a preferred embodiment the users 22, 24, 26, 28, will employ a graphical user interface, based on the Microsoft Windows look-and-feel. This interface will preferably have certain "riles" embedded in the interface so as to facilitate efficient user friendly use. Within the external user interface 2 at the user workstation, many features are provided. For example, data may be retrieved from the central database through the server 4, data in the central database may be updated and data may be added to the central database. Data may be analyzed and modeling of investment trades and mutual funds may be created. Also, within the external user interface 2, investment data may be manipulated by sorting or what-if scenarios.

One of the advantageous features of the present invention is that the server means 4 houses the central database which, in general, serves as a central repository of investment data and multiple users can access data simultaneously. As data changes, the data stored in server 4 will be updated and the users will be provided with the changed data on a global basis.

Figure 2:
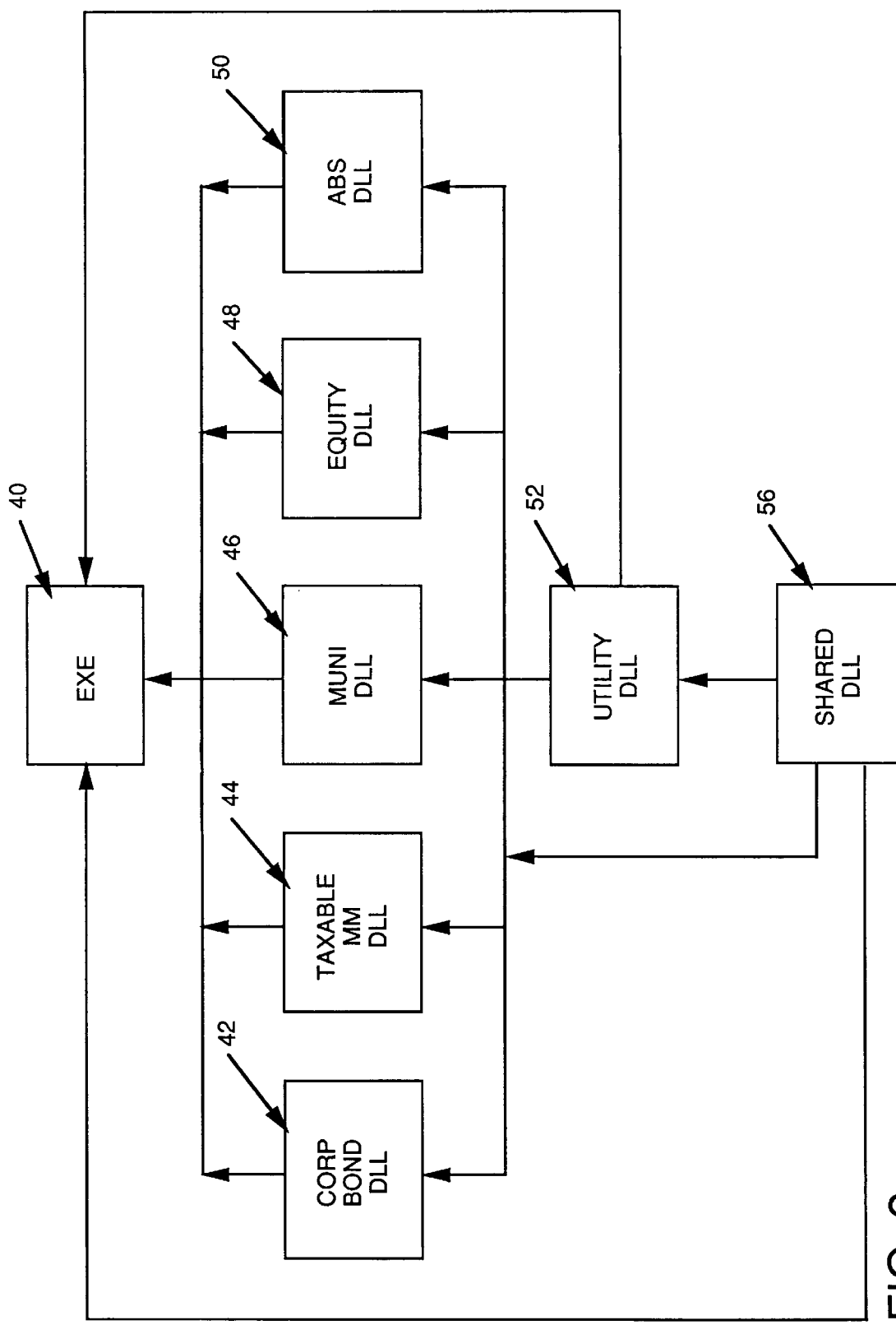
FIG. 2 is an illustration of a form of dynamically linked library employable in the present invention.

In a preferred practice of the present invention, external user interface means 2 will have an open interface which facilitates communication with not only the external nonuser outside data sources 10, 12, 14, 16 through external data interface 6 and server 4, but also the users 22, 24, 26, 28 employ the libraries which, in the preferred form herein, are dynamically linked libraries as exemplified by FIG. 2 that serve as building blocks containing business rules and program logic and act as firewalls. This external user interface 2 connects with the server 4 by means of a suitable communications protocol which will be well known to those skilled in the art, such as TCP/IP (which is a suitable Transmission Control Protocol/Internet Protocol).

Database triggers located within the server means 4 can be employed to trigger events in the server means 4 based on actions taken by the external user interface means 2. For example, data may be propagated to other tables automatically when a given database field is changed in any way.

In another preferred aspect of the invention, a high availability server is employed as server means 4 in order to minimize system down-time. This approach involves the use of duplicate hardware platforms which provides access to the data stored in server means 4 and also can provide data processing and retrieval services. A suitable hardware system providing this back-up capability is that sold under the trade designation Alpha by Digital Equipment Corporation.

The external user interface means 2 may readily be employed with PC-related software tools, including, for example, Microsoft's Visual C++ compiler, Neuron Data's Open Interface toolkit, Intersolv's PVCS version control software, Microsoft's Codeview debugger, Premia's CodeWright editor, Microsoft Query (PC-based Ad Hoc Query Builder), and Reflections for Windows (Terminal Emulator).

The open interface toolkit is employed to build highly portable graphical user interfaces that provide platform specific native look-and-feel. The Microsoft Visual C++ Compiler is software that takes the source code and checks syntax of a specific language and produces linkable object code. The compiler also comes with a linker employed to produce executable code.

The PVCS tool acts as a librarian of source code. More specifically, the PVCS tool permits a team of developers to cooperatively develop applications by supporting the ability for a given developer to "check out" specific code and prevent others from changing the code while it is in use by the developer who originally checked it out. This tool also tracks and reports on all changes to code and assists in building the executable version of an application.

The Codeview debugger is a tool that permits a developer to execute a program and track execution of a single instruction at a time, set points at which the program should halt, and report progress, examine the contents of key variables at any time, and examine the original source code line that generated a given CPU instruction.

The Codewright editor is a tool similar to a word processor that allows programmers to type in the source code for an application. The tool has an awareness of the syntax of a given language so as to make the developer's job easier and improve the quality of the program.

Microsoft Query is a tool that generates SQL based on a visual selection of the information that one desires to extract from a database. The SQL that is generated is then executed by a particular database and the resulting data is returned. The alternative is to generate SQL, by hand, based on documentation of the contents of the database.

The Reflections Terminal Emulator allows a personal computer to emulate a dumb terminal and support a login session on a remote computer. Examples of emulation modes are VT100, VT220, 3270 and X-windows.

In a preferred practice of the invention, the central database is a serverbased Oracle database available from Oracle Corporation with SQL*Net of Oracle Corporation allowing communication between the external user interface and the central database. The system also preferably employs Oracle's Report Writer tool for building and generating reports based on an Oracle relational database which is a preferred central database for the system of the present invention.

It is also preferred to employ Oracle DBMS which is a relational database management system that has tools to allow developers to build applications based on a relational model. Associated tools include a query language interface based on SQL, a report writer, a forms builder, a third generation language interface, such as Pro*C by Oracle, a fourth generation language interface, such as Oracle's PL*SQL which is employed on the server platform and tuning and performance analysis tools. Pro*C is Oracle's third generation language tool that allows SQL to be embedded into C code and executed. PL*SQL is Oracle's fourth generation language that allows SQL to be embedded in a nonprocedural language. It is employed on the server platform.

In the preferred practice of the invention, a number of software tools may be employed to enhance flexibility of spreadsheet use. For example, software tools including multi-key sort utility, column statistics generators, data export facility, column hiding tools, column reordering tools, column freezing tools, ad hoc report writer formatter, charting utility and print tools could be provided. The user may not only access data according to specific requests, but may export the data to industry standard word processors, spreadsheets, analysis tools or data files, for example. Also, the user may hide certain columns, if desired, alter the sequence in which the columns are presented on the screen, freeze one or more columns in a particular location, create a preferred data format, present charts and print from the screen. If desired, the user can store the customized preferences for use in further sessions.

With respect to the nonuser outside sources 10, 12, 14, 16, the external data interface means 2 will be programmed as to frequency with which and times when it will receive data from these sources. For example, it may be programmed to receive data during the night, during the day, both, or periodically in batch form.

The external user interface also contains a spreadsheet interface to facilitate efficient user operation of the graphical user interface. The external user interface has logic means that allows a user to export data contained in the spreadsheet interface to other programs resident on the user or client workstation, such as Lotus'Lotus or Microsoft Excel, for example.

Spreadsheets usable with the present invention include Lotus 1-2-3 available from Lotus Development Corporation and Excel available from Microsoft Corporation.

Referring to FIG. 2, a preferred form of dynamically linked library employable within the external user interface means 2 will be described.

One of the advantages of employing a dynamically linked library (DLL) architecture is that firewalls are created between each specific module. The DLL is preferably located at the client workstation (user workstation) within the external user interface 2. The EXE block 40 provides a simple module that creates the parent window of the application and also initiates a login with server means 4, as well as providing an entry point for each business specific DLL. For example, there is shown in this flow diagram a corporate bond DLL 42, a taxable money market block 44, a municipal bond DLL 46, an equity DLL 48, an asset based security block 50, and a utility DLL 52. The shared DLL 56 contains base-level reusable code that all the other modules are built upon. It is not specific to any project. The utility DLL is built upon lower level primitives contained within shared DLL 56. The utility DLL contains routines that are reused throughout the external user interface 2, including sorting, column manipulation functions, such as hiding, freezing and reordering, for example.

The firewalls between modules provide a significant benefit. For example, a change can be made to the equity DLL module 48 without having to recompile the municipal bond module 46. This serves to limit the amount of damage that a change can make on the overall system.

In a preferred practice of the invention, each DLL will be built upon DLL's that are of lower level in terms of functionality. All of the modules have C functions and primitives. It is preferred to employ C on both the client or user platform and the server platform. By employing a hierarchical approach, lower level functions can be combined to perform more powerful, but more dedicated functions. For example, the sort function located in utility DLL 52 may be employed in the municipal bond portfolio view module which is contained within the municipal DLL 46 to specifically sort municipal bond data. It will be appreciated that each business specific DLL module, 42, 44, 46, 48, 50, is DLL-based and built on top of both the utility DLL 52 and the share DLL 56. Another advantage of this approach is that the DLL concept takes maximum advantage of the DOS Windows architecture, but does not limit the application to being run only on PC's. Other types of workstations can readily be used with the system. This is also a function of the external user interface means having the capability to move software programs to other hardware platforms the Open Interface toolkit may be employed for this purpose.

The server means 4, while sharing processing functions with the external user interface means 2, serves as the primary data repository in the preferred practice of the present invention and, preferably, communicates solely with the external user interface means 2 and external data interface means 6, although, if desired, direct access for certain specific purposes or users could be provided.

In general, the server means 4 will preferably be built upon a relational database which will manage the central database. A suitable relational database for this purpose is the Oracle Database which is available from Oracle Corporation. Data received from the external user interface means 2 and external data interface means 6 will be processed, such as by editing and formatting, employed to update existing data tables within the server means 4, and stored in the appropriate tables for retrieval upon suitable request. In view of the wide range of investment data which will be stored within the system, the information may include any aspects of investments, including mutual fund identity, investment holdings identity, numerical data relating to the same, financial data, transactional data, such as sales, purchases or redemptions, for example, and actual logging of trades along with issuance of confirmations thereof, thereby minimizing or eliminating the use of trade tickets. The system will, therefore, effect the trade without requiring the creation of paper trade tickets. Suitable architecture for the server is the Oracle RDBMS server - Version 7 employing the Open VMS operating system and the preferred use of a high availability server configuration. The server means 4, through the high availability feature, based on statistical evaluation can function in the range of an annual down-time of approximately one hour per year. It will be appreciated that the server not only provides access to the database tables for retrieval of information on a selected basis, but also provides CPU cycles for batch processing where desired. Digital Equipment's Alpha high availability server configuration functions effectively in the present invention.

Suitable triggers support the server means 4. These triggers will fire upon the occurrence of a defined event. The architecture of server 4 of the present invention facilitates portability and scalability (i.e., the ability to easily add computing power and storage to an existing hardware configuration without having to purchase and migrate to an entire new platform) of the server means 4 to a broad spectrum of hardware platforms which may be supported by the database.

Figure 3:
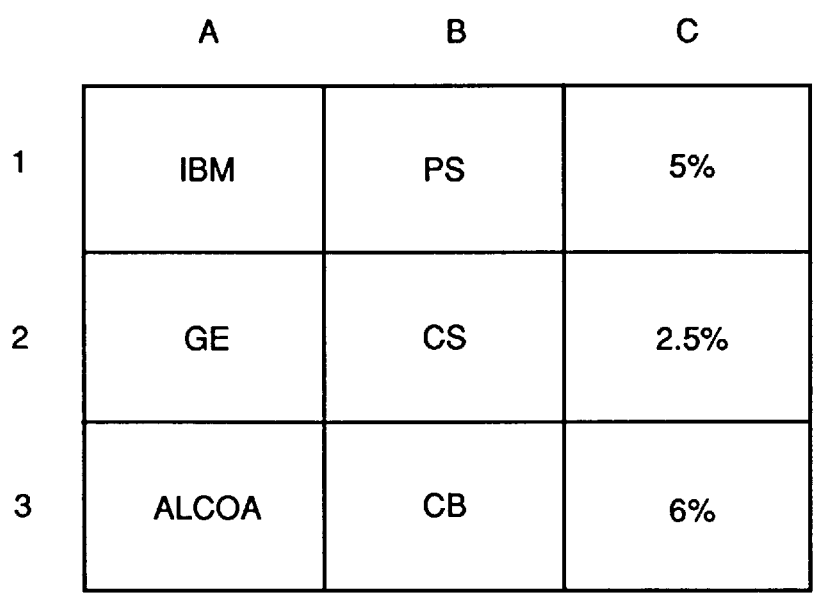

Referring to FIG. 3, a simple example of a single relational database table will be considered. This table may be considered a single database view created by dynamic building of a defined view based on underlying database tables. This is an indication of how data would be stored in the server means 4 for retrieval by users in response to structured inquiries. This data, as stored in the tables, in the server means 4, is stored in rows 1, 2, 3 and columns A, B and C. For example, in row 1, the company IBM is identified. The intersection of row 1 and column A is "IBM." The company identifications are in column A within row 1 being IBM, row 2 being GE, and row 3 being Alcoa. In column B, the nature of the securities are set forth. In row 1, there is preferred stock, in row 2 common stock and, in row 3, a corporate bond. Column C has dividend or yield figures which, for row 1, is 5 percent, row 2 is 2.5 percent, and row 3 is 6 percent. If a user 22, 24, 26, 28 acting through the external user interface 2 desires to access within server means 4, information such as what companies are held by mutual fund XYZ, information from column A of the relational database would be provided. If the user inquiry were to identify companies for which the mutual fund held corporate bonds, the logic within the server means 4 would identify all corporate bond listings in column B and identify Alcoa as being the sole company for which a corporate bond investment has been made in company XYZ. By way of further example, if the inquiry were to identify all holdings wherein dividend or yield was in excess of 4 percent, both IBM and Alcoa would be identified. Employing spreadsheet capability, the user would identify what additional columns of information would be desired. It will be appreciated that FIG. 3 represents a simple example of a single relational database table for storing investment data in list boxes in central database of server means 4. Storage of data in the external user interface 2 is temporal and exists only so long as the user is logged into the portion of the client workstation containing the data and to the server means 4. The relational tables could have hundreds or thousands of rows and columns. The investment data will be retrievable rapidly due to its being related to particular rows and columns.

Figure 4:
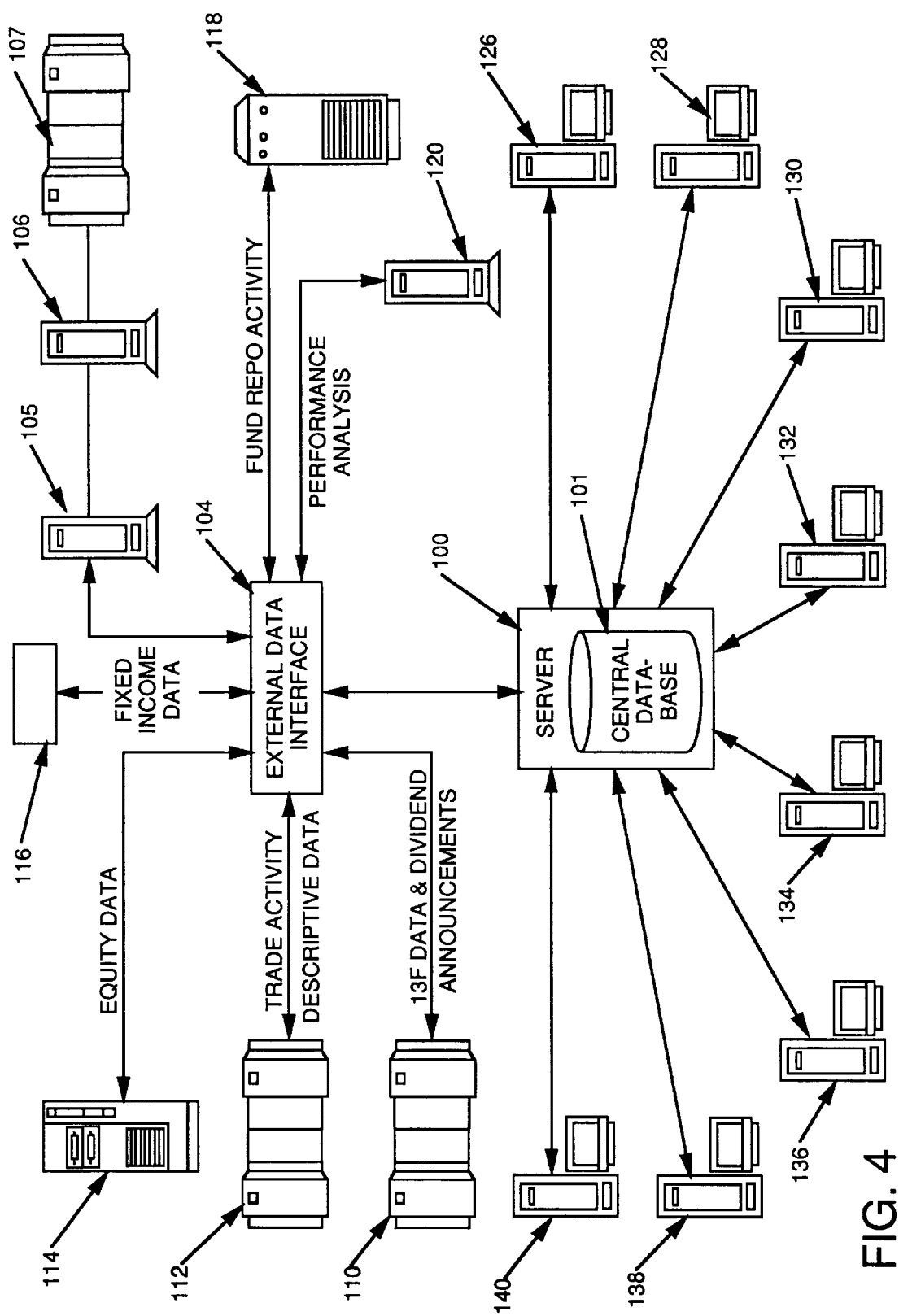
FIG. 4 is a schematic diagram of a form of user arrangement of the present invention.

Referring to FIG. 4, there is shown a further application of the present invention wherein the company server 100, which may be similar to the server means 4 of FIG. 1, supports central database 101. The external interface means 104, which may be similar to the external data interface means 6 of FIG. 1, communicates through interchange architecture 105 and remote message server 106, with a client server 106 in a two-way communication manner. The client server 107, for example, might be a bank which functions in the capacity of mutual fund custodian or record keeper, or both. In this embodiment, the remote message server 106 and client server 107 may be located at the client's place of business and the company server 100, external data interface means 104, and interchange architecture 105 may be at the company's place of business. In this embodiment, the remote message server 106 and external data interface 104 will serve as the means of communication between the client server 107 and the server 100 and central database 101 with the interchange architecture 105 and client message server 107. In addition, a plurality of nonuser outside data sources 110, 112, 114, 116, 118, 120 will communicate with server 100 and central database 101 through external data interface 104 in a manner described hereinbefore. These nonuser outside data sources 110, 112, 114, 116, 118, 120 can provide a wide variety of types of data. For purposes of example only, FIG. 4 shows, respectively, sources of 13F data and dividend announcements (110), trade activity data (112), equity data (114), data on fixed income securities (116), mutual fund repo activity (118) and performance analysis (120). All of this information will be received and processed, revised and stored in the server 100 and central database 101.

Referring still to FIG. 4, with respect to the mutual fund proprietary fund environment, a user workstation 126 may be in two-way communication with the server 100 and supported central database 101.

Also shown in FIG. 4 are a plurality of user workstations each having an external user interface means 126, 128, 130, 132, 134, 136, 138, 140 in communication with server 100 and central database 101. These external user interface means 126–140 (even numbers only) permit users to access the central database 101 simultaneously and enter all inquiries and receive all data permitted within whatever rules have been established with respect to a specific user. The external user interfaces 126–140 (even numbers only) may be at workstations on the same local area network (LAN) as the server 100 and central database 101 or on a wide area network (WAN) at remote sites of a client or user, as desired, on a workstation by workstation basis.

An example of a use of the system when a trade is entered through external user interface means 126 will be considered. Information regarding a trade is introduced into the server 100 from external user interface 126 may be stored for retrieval either by the user through the external user interface 126 or by the custodian server 107 through external data interface 104, the interchange architecture 105, and remote message server 106. For example, if the user at workstation 126 entered a security trade in the mutual fund environment, it may be delivered to the custodian server 107. The custodian server 107 may then return messages to the server 100, such as trade verification, failure or settlement. In this manner, effective real-time communication between the user workstation 126 and the custodian server 107, which may be remotely located, is facilitated.

The communications passing through the interchange architecture 105 are preferably based on the financial industry standard SWIFT format which has been adopted by the Industry Standardization for Institutional Trade Communications (ISITC Group).

The interchange architecture not only facilitates near real-time communications to the custody and fund accounting environments housed within the client server 107, but also this provides real-time feedback to traders and portfolio managers who would be employing user workstation 126, which may be a smart terminal as to the status of the trade, e.g., unsent, sent, acknowledged, verified, failed, and settled. This prompt feedback also provides early information regarding possible problems that might cause a trade to fail and further permits rapid electronic reconciliation of accounts. The invention provides the further advantages of the elimination of the need for manual creation of paper trade tickets and the requirement for storage of such trade related paper. In addition, fewer resources are required to process and verify a trade.

It will be appreciated that a wide variety of investment data can be transmitted in both directions in order to enhance efficiency of trading. While the categories of information data that may be transmitted are potentially limitless, among the sorts of information are trade information, such as trade purchase, sale, cancellation, verification, purchase settlement and sales settlement. In addition, foreign exchange rates, daily prices and positions, security master information, and information to be formatted into various reports within certain time periods, as well as certain information, such as start of day cash balances, may be communicated.

It will be appreciated that the system of FIG. 4 as to certain components may function identical with that of FIG. 1, but offers further variations.

It will be appreciated that as described hereinbefore in respect of FIGS. 1 through 4, the present invention provides opportunities for various types of technical configurations. For example, the system could provide a service bureau model arrangement wherein the server means 4 or server means 100 could be located at the company as in FIG. 4 or at the client site such as custodian server 107.

It will be appreciated by those skilled in the art that the present invention may readily be practiced by programming a general purpose digital computer to configure the computer to perform the disclosed functions in the disclosed ways. In the alternative, if desired, all or portions of the functions may be performed by hardware components in lieu of the software.

Figure 5:
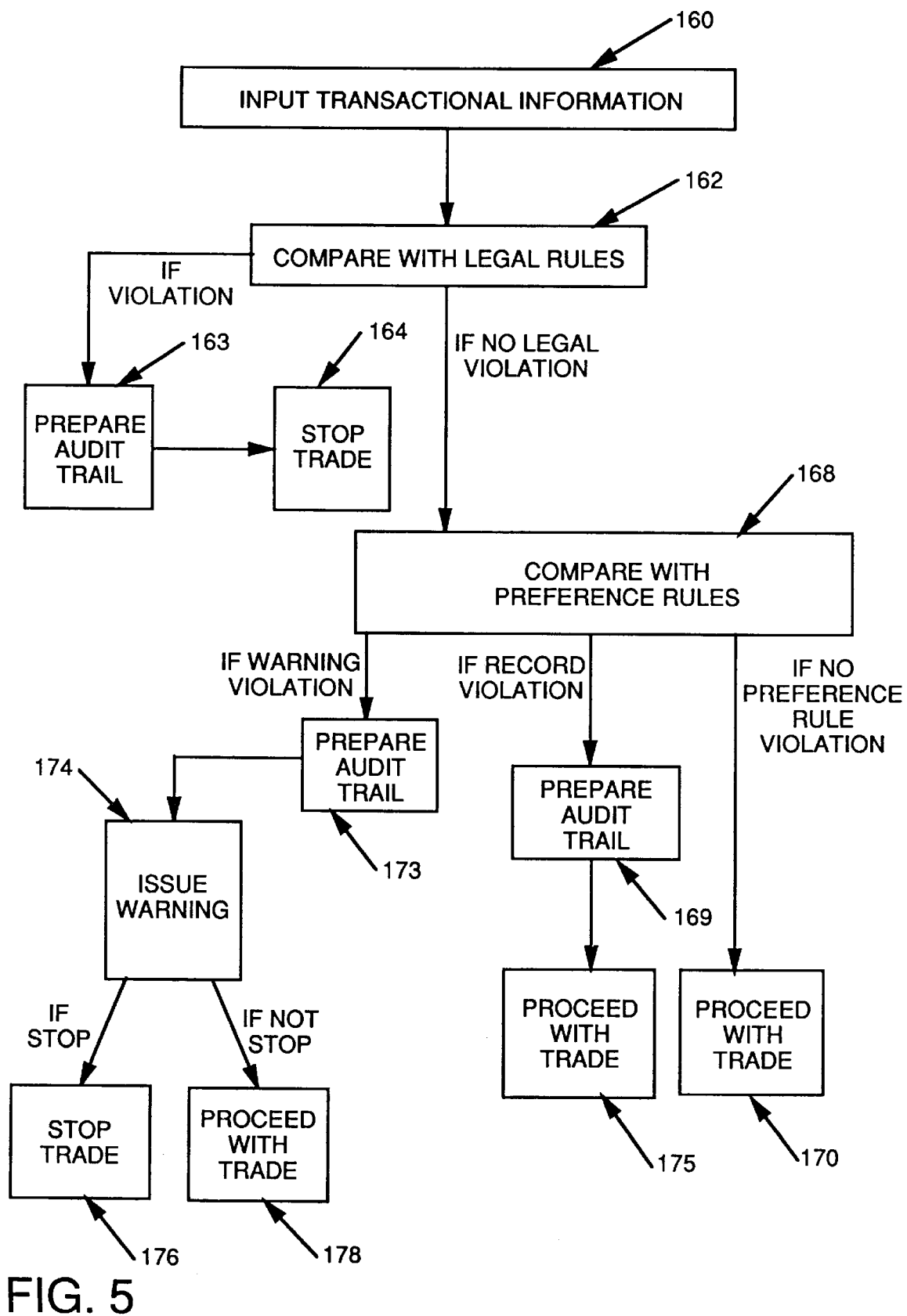
FIG. 5 is a schematic illustration of a compliance embodiment of the present invention.

Referring to FIG. 5, use of the present system in respect of rules-based compliance will be considered. Rules may be invoked, for example, when a trade is to be executed by a user on a workstation employing the external user interface 2. As in some instances where there is no desire or need to have a real-time compliance check, the server means 4, 100 could run the compliance check with the data that drives the rules being stored in the central database. If batch processing during off hours is contemplated, for example, appropriate reports would be generated. If the user has such privileges, he or she may input rules through the external user interface 2. The compliance check may, therefore, be made on the server with the associated central database or by the external user interface with rules stored in the central database.

In general, in compliance evaluations, such as with a mutual fund, the computer will store the portfolio holdings of the mutual fund, as well as storing certain rules. The computer will be presented with a proposed transaction or a proposed portfolio, or a model employed as a management tool, for example, and by comparison of the information regarding the proposed transaction or prospectus and the rules and, where appropriate, the portfolio, will make a determination as to whether the proposed transaction violates any of the rules. Depending upon the nature of the rule violated and the preferred practice of the system user, the consequences may be anything from stopping a trade or delaying a trade pending a further input from the user to doing nothing more than making a record of the departure from the rules. In a first category, the rules may be legal requirements, such as those related to the United States Securities Exchange Commission or the United States Internal Revenue Service governing statutory and regulatory standards. In the event a proposed transaction or prospectus violates such rules, the system would, in the preferred embodiment, issue a message or take action to terminate the transaction. By way of specific example, a mutual fund might be prohibited from purchasing a certain category of stocks or from owning more than a certain percentage of a certain category of investment. These legal requirements may be considered a first group of rules. While the compliance features of the present invention will be discussed herein in respect of compliance and actual transactions or prospectuses, the system may also be employed in modeling the consequences of a hypothetical transaction or prospectus. With respect to business preference items, for example, there may be certain preferences regarding ratings, diversification, maturity dates or yields, or time limits on certain rules that would be introduced into the preference rules. The information needed for compliance determinations will generally be stored in the server means 4 with the transactional information being delivered to the server means by users 22, 24, 26, 28 (FIG. 1) through external user interface 2 or through user interface means 126–140 (even numbers only) of FIG. 4.

Referring to FIG. 5, there is shown investment transactional information input 160 after which it is compared with legal rules 162 and, if appropriate, the mutual fund portfolio holdings. While reference in FIG. 5 is made to a transaction, the compliance module is equally applicable to the prospectus or other aspects of investment compliance with particular emphasis on mutual fund compliance. If a violation of the legal rules is found to exist, the next action is to prepare an audit trail report or record of the event 163 and to stop the trade 164 and communicate such stopping to the user who attempted the transaction or, if batch processing is employed during off hours, appropriate reports would be prepared for subsequent delivery. If no legal rule is violated, the transaction then passes to the comparison with preference rules 168. The preference rules 168 may take the form of certain business preferences imposed by the portfolio manager of the mutual fund, such as legally permissible transactions which, from a business standpoint, the manager of the mutual fund does not desire to enter. It will be appreciated that this category of rules is discretionary and customized to the preference of the particular fund manager. If, as a result of this comparison, the conclusion is reached that there is no violation of the preference rules, then the proposed transaction will have been found to be consistent with both the legal rules 162 and the preference rules 168 and the trade proceeds 170. The user would receive a record or report of compliance approval.

In a preferred practice of the invention, within the preference rules, there is a second group of rules which will trigger a warning and a third group of rules which would not trigger a warning, but will create a report.

If there is a violation of a second group of preference rules, an audit trail report 173 is provided and the communication is provided in block 174 will issue a warning to the user and follow user's instructions. This may result in the user stopping the trade 176 or proceeding with the trade 178. The system will be programmed to accommodate the desires of the user in respect of these preferences. In the warning mode, the user will receive a message indicating that there has been a departure from the specific rule and be required to input whether he or she wishes to have the trade proceed. In some instances, the management might regard the violation as being so minor that merely keeping a record of the departure for future retrieval is all that would be required.

If the second group of rules falling in the warning category is satisfied, but a third group of rules not triggering a warning is violated, merely an audit trail record is prepared 169 and the trade proceeds 175.

The compliance system may also be employed to determine if a proposed prospectus is in compliance with legal rules and preference rules. The procedure described in connection with FIG. 5 could be employed. Rather than terminating a transaction, the prospectus would be subjected to the same type of rules-based scrutiny with similar multitier standards.

If desired, a system might eliminate the second or third groups of rules or add additional groups. Reports or records of violations may be delivered to the user involved and to a compliance officer or auditor, for example.

All of this compliance monitoring is preferably done in real-time so as to maintain the high speed efficiency of the system, while minimizing the likelihood of undesired departure from legal rules or portfolio manager preferences.

Figure 6:
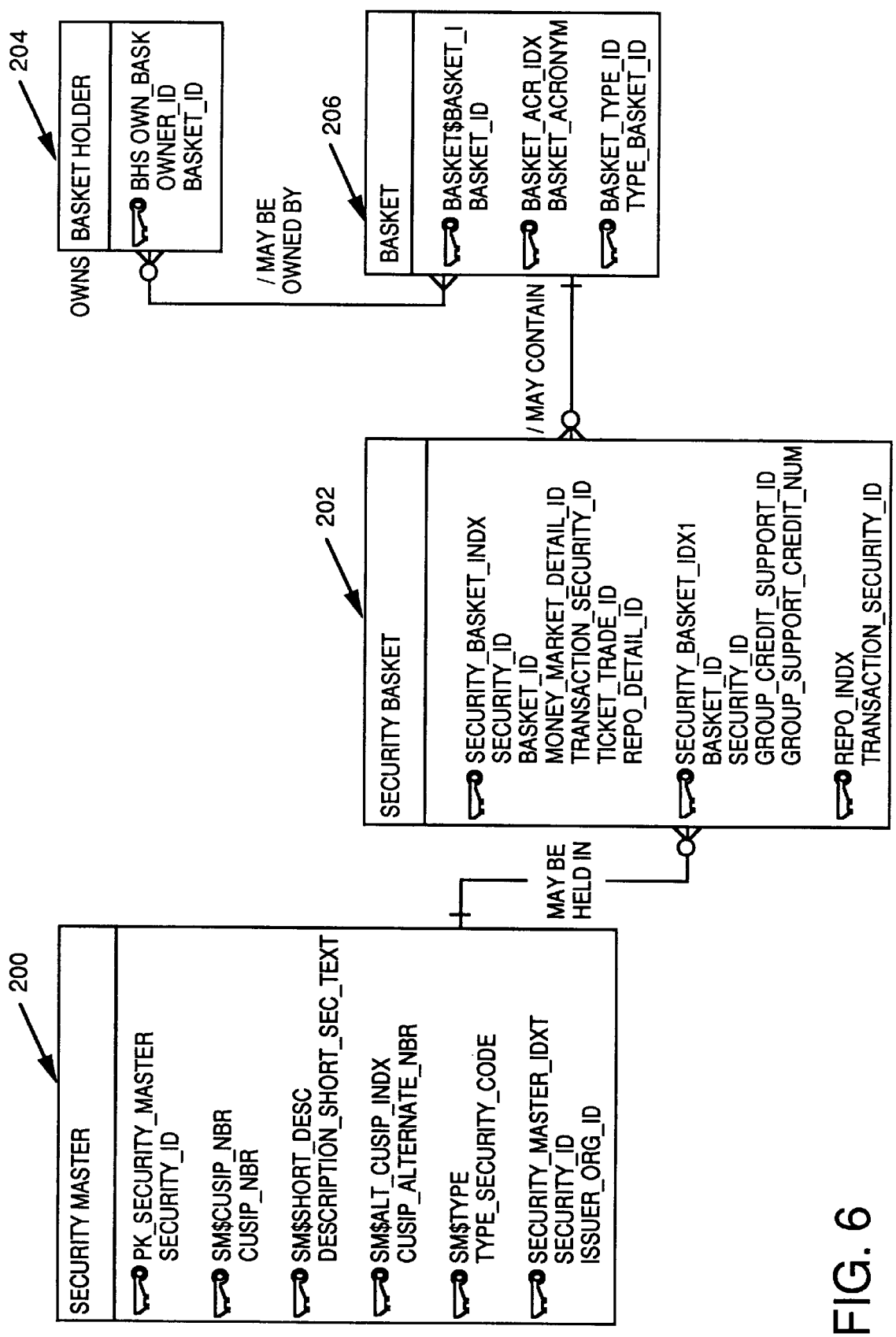
FIG. 6 is a schematic diagram of an example of a group of security baskets employable in the present invention.

Referring to FIG. 6, there is shown data stored in related list tables in the central database. For convenience of reference, a grouping of any securities will be referred to as "baskets." This figure also illustrates another feature of the present invention. The security master table 200 will provide information regarding all investments which are issued and available for investment by a mutual fund or any collection of securities, in general. For example, as to a given company, such as IBM, it might list its common stock, its preferred stock, and other categories of IBM securities, as well as similar information for Alcoa, General Electric and other investments available for investment by a mutual fund. The security master table 200 is connected to security basket table 202 which will list the securities held by the mutual fund identified in basket table 206. It will be appreciated, therefore, that when one retrieves information by naming a mutual fund, the basket 206 for that fund is connected to the security basket table 202 which provides information regarding all of the investments held in the particular mutual fund, which security basket table 202 is, in turn, connected to security master table 200.

One of the unique features of the present invention is that the basket identified in basket 206 may actually be either a single fund or a group of funds combined for purposes of transactions, portfolio management administration or modeling or other desired objectives. Similarly, a fictitious fund consisting of one or more segments of an individual mutual fund or all or portions of a plurality of mutual funds, such as, for example, all of the holdings in a particular type of investment, such as high yield government bonds or in a particular company, such as IBM, or any investment satisfying other parameters may be given a single name and treated as a "fund." The concept of combining funds or combining segments of funds is referred to as "rolling up" or decomposing funds. The system, otherwise, will treat whatever is identified in the basket 206 as a fund with corresponding information being provided in security master 200 and security basket 202. The basket holder 204 provides supplemental information with respect to basket 206 by identifying the component parts if it is a fund made up of a group of funds or portions thereof. These added degrees of flexibility enhance the capabilities of the present system.

It will be appreciated, therefore, that the present invention provides an improved system for receiving, processing, storing, creating, displaying and acting upon a wide variety of investment data, including the data employed in managing mutual funds and effecting trades. This system also provides electronic execution of transactions, such as sales, purchases or redemptions, thereby reducing paperwork, for example. This is accomplished by a combination of features, including having an external user interface/server arrangement which divides the processing between the two units. It also provides for numerous nonuser outside sources of information to be received within the system through an external data interface, while permitting users to access the information in the external user interface and in the server which supports the central database through the external user interface without requiring different interfaces for each of the nonuser outside external sources of information. The system further provides, in preferred forms, the use of relational databases and central data repository, the use of dynamically linked library architecture with firewalls, rules-based compliance systems and great flexibility in respect of storage and communication of investment information. The system also provides the flexibility of connecting baskets which may include as a single "fund" for system purposes a grouping of (a) a plurality of mutual funds, (b) portions of a plurality of mutual funds, or (c) portions of a single mutual fund. All of this is accomplished while facilitating use of high availability server configurations, graphic user interfaces, reusable software toolkits, and spreadsheet presentations. This is all accomplished in a rapid, efficient manner which reduces or eliminates the amount of paperwork and delays involved while enhancing accuracy of operation.

While the disclosure herein has made specific reference to use of the system with mutual fund investment monitoring and record-keeping, it will be appreciated that the system may also be employed for various other types of investment securities.

Whereas particular embodiments of the invention have been described herein for purposes of illustration, it will be appreciated by those skilled in the art that numerous variations in the details may be made without departing from the invention as described in the appended claims.

I claim:

1. A computerized data processing system for receiving, processing and accessing investment data comprising external data interface means for receiving and processing investment data from nonuser outside sources, server means in communication with said external data interface means for receiving said nonuser outside source data from said external data interface means and storing said investment data in a central database supported by said server, said server means having means for processing said investment data, external user interface means in communication with said server means for processing data and delivering inquiries and data to said server means and receiving investment data from said server means, said server means having means for delivering to said user interface means investment data stored in said central database, means for permitting substantially simultaneous access to said server means through said external user interface means by a plurality of users, said server means employing a relational database, said external user interface means having dynamically linked library means, said dynamically linked library having firewalls separating individual business processing logic, and said second server means having means to process said received investment data and respond to said user workstation in the capacity of a custodian.

2. A computerized data processing system for receiving, processing and accessing investment data comprising external data interface means for receiving and processing investment data from nonuser outside sources, server means in communication with said external data interface means for receiving said nonuser outside source data from said external data interface means and storing said investment data in a central database supported by said server, said server means having means for processing said investment data, external user interface means in communication with said server means for processing data and delivering inquiries and data to said server means and receiving investment data from said server means, said server means having means for delivering to said user interface means investment data stored in said central database means for permitting substantially simultaneous access to said server means through said external user interface means by a plurality of users, said central database having a security master data storage table listing investments available and a basket table connected thereto containing investment data related to at least one mutual fund, and said system having at least one basket table for each said mutual fund.

3. A computerized data processing system for receiving, processing and accessing investment data comprising external data interface means for receiving and processing investment data from nonuser outside sources, server means in communication with said external data interface means for receiving said nonuser outside source data from said external data interface means and storing said investment data in a central database supported by said server, said server means having means for processing said investment data, external user interface means in communication with said server means for processing data and delivering inquiries and data to said server means and receiving investment data from said server means, said server means having means for delivering to said user interface means investment data stored in said central database, means for permitting substantially simultaneous access to said server means through said external user interface means by a plurality of users, said central database having a security master data storage table listing investments available and a basket table connected thereto containing investment data related to at least one mutual fund, and said system having a plurality of said basket tables for each said fund including a first basket table for identifying a specific mutual fund and a second basket table listing data regarding the security holdings of said mutual fund.

4. The data processing system of claim 3 including said first basket table being connected to said second basket table.

5. The data processing system of claim 4 including a third said basket table for identifying the component parts of a mutual fund identified in said second basket table when said mutual fund includes a combination of all or portions of a plurality of mutual funds.

6. The data processing system of claim 5 including said third basket table being connected to said second basket table.

7. A computerized data processing system for receiving, processing and accessing investment data comprising external data interface means for receiving and processing investment data from nonuser outside sources, server means in communication with said external data interface means for receiving said nonuser outside source data from said external data interface means and storing said investment data in a central database supported by said server, said server means having means for processing said investment data, external user interface means in communication with said server means for processing data and delivering inquiries and data to said server means and receiving investment data from said server means, said server means having means for delivering to said user interface means investment data stored in said central database, means for permitting substantially simultaneous access to said server means through said external user interface means by a plurality of users, said server means employing a relational database, said external user interface means having dynamically linked library means, said dynamically linked library having firewalls separating individual business processing logic, and said business processing logic including lower level primitives which may be employed individually or in combination with other said lower level primitives to perform specific functions on data stored in said libraries.

8. A method of computerized investment data processing comprising receiving through external data interface means investment data from nonuser outside sources, processing at least a portion of said investment data within said external data interface means, delivering said processed investment data from said external data interface means to server means and storing said delivered data in a central database supported by said server means, processing at least a portion of said data within said server means, retrieving investment data by external user interface means in communication with said server means, delivering at least some of said data to said external user interface means from said server means, facilitating substantially simultaneous access to said server means through said external user interface means by a plurality of users, employing in said server means a relational database, and entering investment information through an external user interface at a user workstation which communicates with second server means through said server means and said external data interface means.

9. The data processing method of claim 8 including interposing interchange communication means between said second server means and said external data interface means.

10. A method of computerized investment data processing comprising receiving through external data interface means investment data from nonuser outside sources, processing at least a portion of said investment data within said external data interface means, delivering said processed investment data from said external data interface means to server means and storing said delivered data in a central database supported by said server means, processing at least a portion of said data within said server means, retrieving investment data by external user interface means in communication with said server means, delivering at least some of said data to said external user interface means from said server means, facilitating substantially simultaneous access to said server means through said external user interface means by a plurality of users, employing in said central database a security master storage table listing investments available and at least one basket table connected thereto containing investment data related to at least one mutual fund, and employing at least one basket table for each said mutual fund.

11. A method of computerized investment data processing comprising receiving through external data interface means investment data from nonuser outside sources, processing at least a portion of said investment data within said external data interface means, delivering said processed investment data from said external data interface means to server means and storing said delivered data in a central database supported by said server means, processing at least a portion of said data within said server means, retrieving investment data by external user interface means in communication with said server means, delivering at least some of said data to said external user interface means from said server means, facilitating substantially simultaneous access to said server means through said external user interface means by a plurality of users, employing in said central database a security master storage table listing investments available and at least one basket table connected thereto containing investment data related to at least one mutual fund, and employing a plurality of said basket tables for each said mutual fund including a first basket table for identifying a specific mutual fund and a second basket table listing data regarding the security holdings of said mutual fund.

12. The data processing method of claim 11 including connecting said first basket table and said second basket table.

13. The data processing method of claim 11 including employing a third said basket table for identifying the component parts of a mutual fund identified in said second basket table when said mutual fund includes a combination of all or portions of a plurality of mutual funds.

14. The data processing method of claim 13 including connecting said third basket to said second basket.

15. A method of computerized investment data processing comprising receiving through external data interface means investment data from nonuser outside sources, processing at least a portion of said investment data within said external data interface means, delivering said processed investment data from said external data interface means to server means and storing said delivered data in a central database supported by said server means, processing at least a portion of said data within said server means, retrieving investment data by external user interface means in communication with said server means, delivering at least some of said data to said external user interface means from said server means, facilitating substantially simultaneous access to said server means through said external user interface means by a plurality of users, employing in said server means a relational database, employing in said external user interface means dynamically linked library means, employing in said dynamically linked library a plurality of firewalls separating individual business processing logic, and employing in said business processing logic lower level primitives individually or in combination with other said lower level primitives to perform specific functions on data stored in said libraries.

* * * * *

UNITED STATES PATENT AND TRADEMARK OFFICE
CERTIFICATE OF CORRECTION

PATENT NO. : 5,893,079

DATED : April 6, 1999

INVENTOR(S) : Daniel Cwenar

It is certified that error appears in the above-identified patent and that said Letters Patent is hereby corrected as shown below:

Col. 5, line 46, "riles" should read —rules—as originally submitted.

Signed and Sealed this

Twentieth Day of June, 2000

Attest:

Q. TODD DICKINSON

Attesting Officer

Director of Patents and Trademarks